United States Patent Office 3,444,690
Patented May 20, 1969

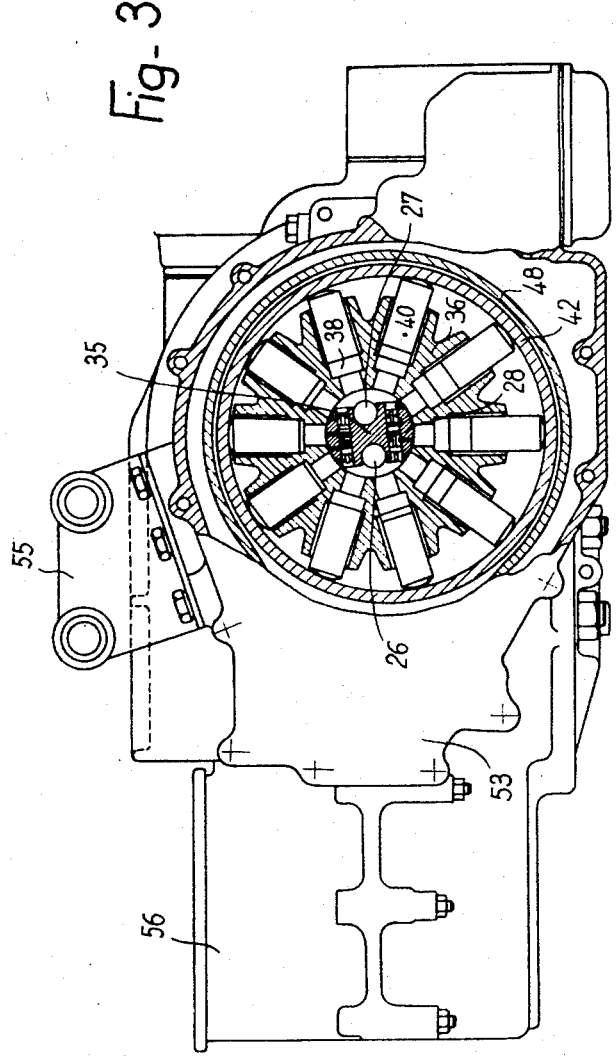

3,444,690
**APPARATUS FOR THE HYDROSTATIC TRANS-
MISSION OF MECHANICAL TORQUE**
Edmond Henry-Biabaud, Paris, France, assignor to
Societe Anonyme Andre Citroen, Paris, France
Filed May 5, 1967, Ser. No. 636,316
Claims priority, application France, May 23, 1966,
62,513
Int. Cl. F16d *31/02, 33/00;* F04b *1/10*
U.S. Cl. 60—53                                    7 Claims

ABSTRACT OF THE DISCLOSURE

Apparatus for the hydrostatic transmission of a mechanical torque, which comprises a rotary barrel pump having a fixed spherical distributor face and an adjustable spherical face for regulating the cylinder displacement, said pump supplying fluid under pressure to a plurality of hydraulic motors, characterised in that it is driven laterally through stepdown gears so disposed as to assist in reducing the losses of efficiency in the transmission and balancing at least partially the efforts produced during the operation of the apparatus.

---

The present invention relates to apparatus for the hydrostatic transmission of the mechanical torque of an internal combustion engine by means of a pump driven from said engine and acting as a generator of fluid under pressure for actuating one or a plurality of hydraulic motors; more particularly, this invention is concerned with an apparatus wherein the pump is driven laterally instead of being driven in the direction of the pump rotor axis.

In fact, this disposal is necessary when the axial dimension of the assembly is limited, as in the case of the transmission to the drive wheels of an automotive vehicle. Moreover, it permits of reducing the output speed, this possibility being extremely advantageous when the speed rating of the driving engine is relatively high and the torque to be transmitted relatively low, as these two parameters would make it particularly difficult to use the pump under direct drive conditions.

Moreover, to avoid a loss of efficiency when using the reducing gear instead of the direct drive, the gear train of the reducing device is calculated with a view to at least partially balance the stress applied to the rotary barrel of the pump and to cause this stress to be exerted as close as possible to the line along which said barrel reacts against the main bearing supporting it and mounted in the pump case.

On the other hand, this barrel pump comprises a floating distributing swash plate having a spherical face engaged by said pump barrel, and the contact between these two elements, depending on the axial and suitably balanced efforts to which the barrel is submitted, is maintained notably when starting the pump operation in order to prime the output thereof.

An apparatus according to this invention for the hydrostatic transmission of a mechanical torque, which comprises a rotary barrel pump having a fixed spherical swash plate and a spherical plate for adjusting the pump cylinder displacement, adapted to supply energizing fluid to one or a plurality of hydraulic motors, is characterised notably in that it is driven laterally through reducing gears so arranged as to assist in reducing power losses in the transmission and at least partially balance the efforts created during its operation.

The advantageous features characterising this invention will appear more clearly as the following description proceeds with reference to the accompanying drawing, in which:

FIGURE 3 is a fragmentary section taken along the line III—III of FIGURE 2 of one of the hydraulic motors, the section being taken across the motor axis.

Figure 1:
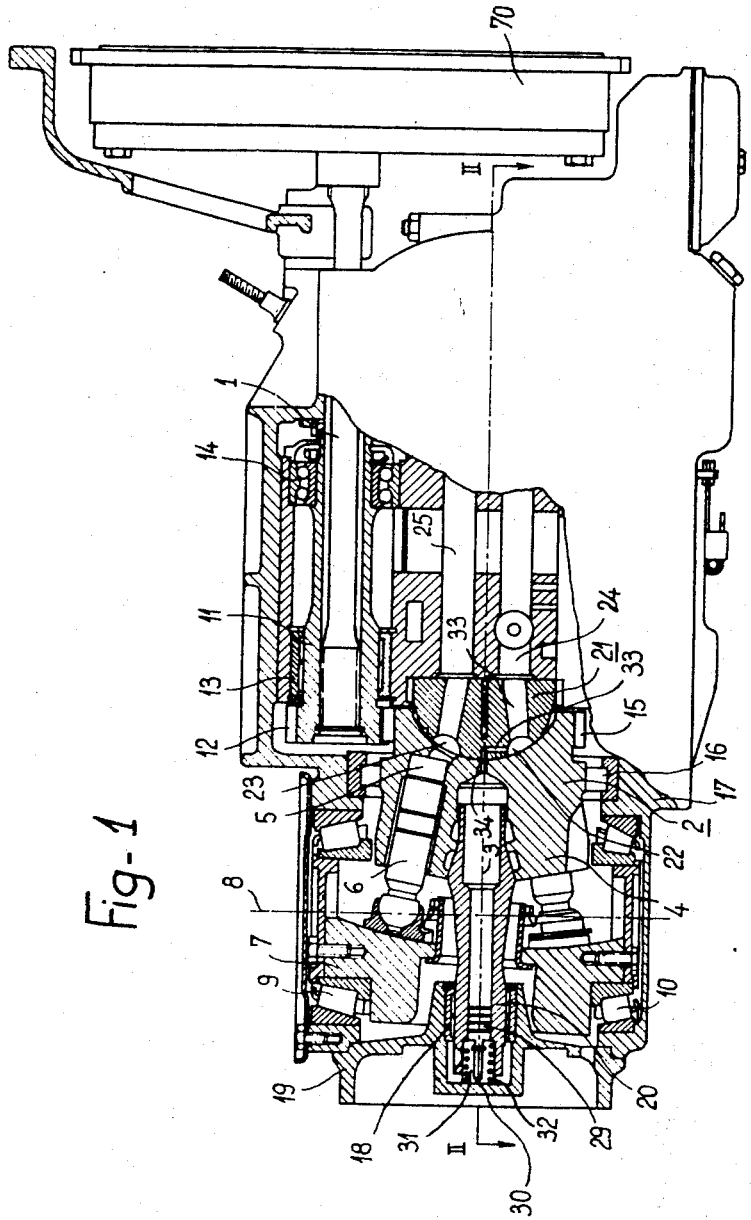
FIGURE 1 is a diagrammatical, part-sectional view of the generator and motor assembly according to this invention, the section being taken along the line I—I of FIGURE 2.

Referring first to FIGURE 1, an internal-combustion engine (not shown) drives through a clutch 70 a shaft 1 parallel to the axis 3 of the rotor 4 or barrel of the barrel pump 2 of the generator-motor plant. This barrel 4 has a plurality of cylinders 5 formed therein, each cylinder 5 driving a piston 6 reacting against the part-spherical face of a fixed swash plate 7 adjustable by rotation about an axis 8 perpendicular to the plate axis and coincident with the common axis of aligned bearings 9 and 10, the swash plate 7 being mounted on the inner races of these bearings, as shown.

The pump is driven through a pinion 12 mounted on a hollow shaft 11 surrounding the shaft 1 and driven from the latter by means of inner splines, said hollow shaft 11 being carried by a needle-bearing 13 and a ball-bearing 14.

The aforesaid pinion 12 is in constant meshing engagement with an annular set of gear teeth 15 cut directly in the outer periphery of the pump barrel 4.

This barrel 4 is carried by a roller-bearing 16 mounted in the pump case 17 and centered by a needle-bearing 18 fitted in the end flange 19 of the pump case and engaged by a hollow shaft 20 rigid with said barrel 4.

A floating spherical distributor 21 formed with fluid inlet and outlet ducts 22 and 23 respectively communicates with longitudinal ducts 24 and 25 supplying energizing fluid to the pair of hydraulic motors disposed on either side of the plane of FIGURE 1.

The hollow shaft 20 of barrel 4 has slidably mounted therein a piston 29 adapted to abut with its rod the bottom 30 of an aligned cavity 31 formed in the aforesaid flange 19 of the pump case; a coil compression spring 32 constantly urges said hollow shaft 20 away from the bottom 30 of said flange cavity so as to resiliently press the barrel 4 solid with hollow shaft 20 against the spherical face of distributor 21, so that when the engine is started the pump output is safely primed. Under normal operating conditions the hollow shaft cavity 31 receives the service or input fluid pressure through ducts 33 and 34; piston 29 then abuts against the bottom wall 30 and the pressure exerted thereat, minus that applied to the cross-sectional area of duct 34, will move the barrel 4 back against the distributor 21. When the vehicle is allowed or caused to coast the pump operates as a motor and piston 29 receives the corresponding pressure, the piston diameter providing a cross-sectional area sufficient to counteract the axial component of pinion 12 which, having reversed its direction of rotation, will thus tend to move the barrel 4 away from distributor 21.

In the above-described pump arrangement it is thus clear that the efforts produced during the pump operation can be balanced to a large extent. These efforts comprise notably:

The force $F_1$ of the driving torque which is exerted by the pinion 12 on the annular set of teeth 15 of the barrel and comprises a radial meshing component $f_1$ directed towards the axis 3;

The force $F_2$ or reaction of swash plate 7 bearing against the adjustment axis 8 of this plate;

The force $F_3$ or barrel reaction resulting partially from the obliquity of the cylinder axes with respect to the spherical surface of distributor 21;

The force $F_4$ resulting from the fluid pressure exerted on the barrel at the level of ports 22 and 23 of distributor 21.

As the barrel revolves in the clockwise direction as seen from the side of the swash plate 7, the pressure zone lies in the upper half of the apparatus and the forces $F_1$, $F_3$ and $F_4$ are applied at closely-spaced points located in the vicinity of the bearing line of roller-bearing 16, the latter absorbing the greater part of the stress exerted on the barrel 4.

The balance effect results directly from the application of pressure to the flat face of the distributor.

The partial balancing effects thus obtained improve the pump efficiency and similar measures are taken in the design of the hydraulic motors.

The coaxial rotors 36 and 37 (FIGURE 2) of these hydraulic motors revolve about a common axis 35.

Each rotor comprises a plurality of radial cylinders designated by the reference numerals 38 and 39 respectively, their axes being mutually and slightly inclined on either side of a plane perpendicular to the aforesaid axis 35. A common cylindrical distributor 28 communicates with the pump through ducts 26 and 27. Slidably mounted in these cylinders are pistons 40 and 41, respectively, having their external rods bearing against corresponding tracks 42 and 43 of eccentric members permitting modification of their stroke as required.

To prevent the rods of these pistons 40 and 41 from sliding on their guiding tracks, these are mounted on a pair of rings, respectively 44 and 45, each ring being carried by a relevant ball-bearing 46 and 47 supported by the member, 48 or 49, for controlling the eccentric.

The efficiency of the transmission is greatly improved by this elimination of the sliding contact between the piston rods and the tracks 42 and 43, as these tracks are rotatably driven from said rods. As the piston ends have a rounded contour their points of contact with the relevant tracks vary during the rotation and the pistons are then caused to rotate about their axes, thus avoiding a substantial cause of premature wear.

Finally, interconnected ducts 50, 51 and 52 formed in the spherical distributor 21 create through leakages produced at the outer periphery thereof the partial hydrostatic balance thereof.

FIGURE 3 illustrates the cylindrical face 28 described in the applicant's French patent No. 61,850 of May 16, 1966, and entitled "Reversible Hydrostatic Machine with Reversible Timing." This device permits the automatic timing of the bridge portions of face 28 when, during either a discontinuation of the vehicle acceleration or a brake appliction, the speeds of the motors are changed and these operate as pumps for absorbing the kinetic energy of the vehicle.

Figure 2:
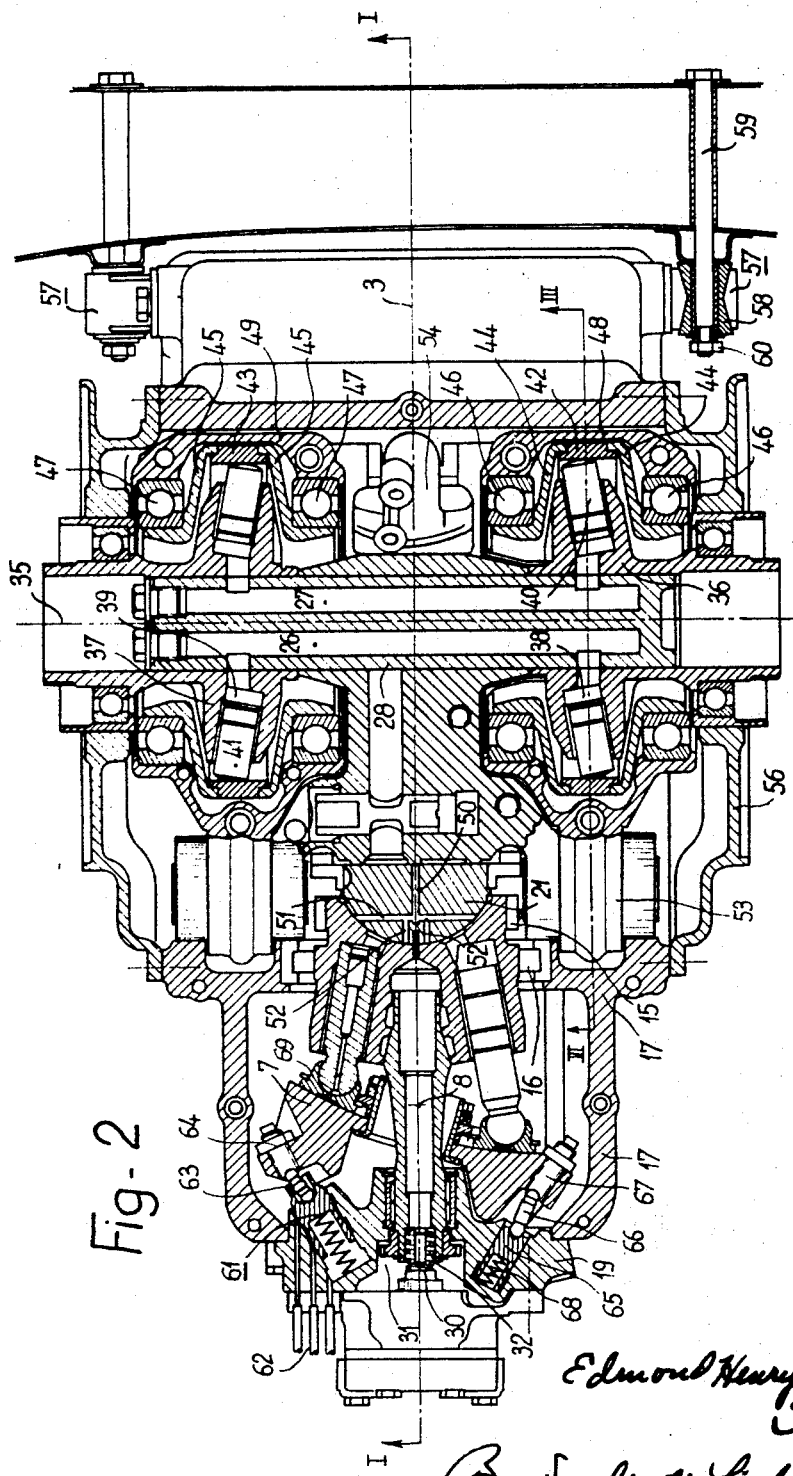
FIGURE 2 is a section taken along the line II—II of FIGURE 1 which contains the pump axis and the axes of the two hydraulic motors.

As already explained hereinabove, the track 42 is adapted to roll in the supporting member 48 pivoted substantially at 53 and controlled at 54 (FIGURE 2). Member 55 partakes in the mounting of the hydraulic motor comprising the rotor or barrel 36 on the vehicle, and the reference numeral 56 designates one portion of the case connected to the main case or body 17 of the pump.

The rear portion of the case (FIGURE 2) is secured by means of elastic mountings 57 comprising each a rubber bushing 58 receiving therethrough a bolt 59 tightened by a nut 60.

In the same figure the reference numeral 62 designates the pipe lines supplying control fluid to the actuator 61 for adjusting the position of swash plate 7 slidably engaged by the hydrostatically balanced ball-and-socket follower 69 of pistons 6. The piston of actuator 61 is adapted through the medium of a double swivel joint link 63 rotatably to drive about the adjustment axis 8 the swash plate 7 by means of the mounting element 64 thereof; another piston 65 bears by servo-pressure effect against the mounting element 67 of swash plate 7 through the medium of the double swivel joint link 66 to eliminate any play in the adjustment thereof.

Although the present invention has been described with certain specific details, it will be readily understood by anybody conversant with the art that the form of embodiment shown and described herein should not be construed as limiting the scope of the invention since many modifications may be brought thereto without departing from the spirit and scope of the invention as set forth in the appended claims. Thus, the driving shaft may have its axis disposed obliquely in relation to the pump axis and in this case the pump shaft is driven through bevel gears.

The annular set of teeth of barrel 4 illustrated as being cut in the barrel body may also consist of a separate toothed ring fastened to this body in any suitable and known manner.

Besides, the cylindrical gears used if the driving and driven shafts are parallel may comprise helical teeth or spur teeth indifferently; however, as helical teeth create an axial reaction component the latter must be taken into account and compensated in order to derive the maximum benefit from the more regular operation or drive resulting from gears of this type.

I claim:

1. Apparatus for the hydrostatic transmission of a mechanical torque, comprising a rotary barrel pump with cylinders having a fixed spherical distributor face and an adjustable spherical face for regulating the cubic capacity of the cylinders, a plurality of hydraulic motors supplied with fluid under pressure by said pump, means disposed laterally driving said pump through stepdown gears, said means being located with reference to said pump to assist in reducing the losses of efficiency in the transmission and balancing at least partially the forces produced during operation.

2. Apparatus according to claim 1, wherein said barrel of said pump is supported in its median portion by a bearing, a drive shaft parallel to the axis of said barrel pump having a fixed pinion, and a toothed ring in close proximity of said bearing in constant meshing engagement with said pinion.

3. Apparatus according to claim 2 wherein said pinion and ring have spur teeth.

4. Apparatus according to claim 2 wherein said pinion and ring have helical teeth.

5. Apparatus according to claim 4 wherein the axial reaction of said helical teeth is balanced, when the pump operates as a motor, by a hydraulic actuator of the piston and cylinder type fed with fluid under pressure from said motors operating as pumps.

6. Apparatus according to claim 1 wherein the forces of said driving means are applied adjacent the axis of said barrel pump and at the level of said spherical distributor face.

7. Apparatus according to claim 1 wherein the shaft of said motors is disposed obliquely in relation to the barrel pump axis and said driving means are of the bevel type.

References Cited

UNITED STATES PATENTS

| | | | |
|---|---|---|---|
| 3,283,725 | 11/1966 | Scott et al. | 103—162 |
| 3,233,555 | 2/1966 | Wahlmark | 103—162 |

FOREIGN PATENTS

| | | |
|---|---|---|
| 1,200,135 | 9/1965 | Germany. |

EDGAR W. GEOGHEGAN, *Primary Examiner.*

U.S. Cl. X.R.

103—161, 162